United States Patent
Schlippe

(10) Patent No.: US 9,758,018 B2
(45) Date of Patent: Sep. 12, 2017

(54) CONTROL ELEMENT AND ASSEMBLY FOR AN AIR VENT AS WELL AS METHOD FOR MOUNTING A CONTROL ELEMENT

(71) Applicant: ITW FASTENER PRODUCTS GmbH, Iserlohn (DE)

(72) Inventor: Michael Schlippe, Kaiserslautern (DE)

(73) Assignee: Illinois Tool Works Inc., Glenview, IL (US)

( * ) Notice: Subject to any disclaimer, the term of this patent is extended or adjusted under 35 U.S.C. 154(b) by 520 days.

(21) Appl. No.: 14/335,979

(22) Filed: Jul. 21, 2014

(65) Prior Publication Data

US 2015/0072605 A1 Mar. 12, 2015

(30) Foreign Application Priority Data

Sep. 10, 2013 (DE) .................. 10 2013 109 934

(51) Int. Cl.
*B60H 1/00* (2006.01)
*B60H 1/24* (2006.01)
*B60H 1/34* (2006.01)

(52) U.S. Cl.
CPC ............. *B60H 1/24* (2013.01); *B60H 1/0065* (2013.01); *B60H 1/3421* (2013.01); *B60H 2001/3471* (2013.01); *Y10T 29/49945* (2015.01)

(58) Field of Classification Search
None
See application file for complete search history.

(56) References Cited

U.S. PATENT DOCUMENTS

| | | | | | |
|---|---|---|---|---|---|
| 4,665,804 | A | * | 5/1987 | Miyasaka | B60H 1/3428 454/315 |
| 5,069,112 | A | * | 12/1991 | Takayama | B60H 1/3428 454/155 |
| 5,393,262 | A | * | 2/1995 | Hashimoto | B29C 45/0017 454/155 |
| 5,766,070 | A | * | 6/1998 | Schwarz | B60H 1/3421 454/155 |
| 7,162,773 | B2 | * | 1/2007 | Song | B60H 1/3414 16/110.1 |
| 9,073,407 | B2 | * | 7/2015 | Kober | B60H 1/3414 |
| 9,162,551 | B2 | * | 10/2015 | Yamamoto | B60H 1/3428 |
| 2001/0031619 | A1 | * | 10/2001 | Yabuya | B60H 1/3421 454/155 |

(Continued)

FOREIGN PATENT DOCUMENTS

CN 1626372 6/2005
DE 4334535 9/1994

(Continued)

OTHER PUBLICATIONS

Instruction Manual Type Gunclean Toftejorg SSt40T, Jun. 9, 2012.

*Primary Examiner* — Gregory Huson
*Assistant Examiner* — Martha Becton
(74) *Attorney, Agent, or Firm* — Joseph M. Butscher; The Small Patent Law Group, LLC

(57) ABSTRACT

A control element (16) for an air vent (10) in a vehicle has a bearing portion which serves for the air-vent-side bearing of the control element (16) and includes a receptacle (22), in particular for a slat (12) of an air vent (10), and a spring element (34) which protrudes into the receptacle (22) of the bearing portion, wherein the spring element (34) is integrally molded to the control element (16).

13 Claims, 2 Drawing Sheets

(56) References Cited

U.S. PATENT DOCUMENTS

| | | | | |
|---|---|---|---|---|
| 2004/0171344 | A1* | 9/2004 | Krause | B60H 1/3421 454/315 |
| 2005/0097704 | A1* | 5/2005 | Song | B60H 1/3414 16/110.1 |
| 2006/0014485 | A1* | 1/2006 | Sousa | B60H 1/3421 454/315 |
| 2007/0111653 | A1* | 5/2007 | Endou | B60H 1/3421 454/155 |
| 2009/0286462 | A1* | 11/2009 | Goto | B60H 1/3428 454/155 |
| 2012/0129444 | A1* | 5/2012 | Kober | B60H 1/3414 454/284 |
| 2012/0291893 | A1* | 11/2012 | Yamamoto | B60H 1/3428 137/551 |
| 2013/0165034 | A1* | 6/2013 | Jang | B60H 1/3428 454/155 |

FOREIGN PATENT DOCUMENTS

| | | |
|---|---|---|
| DE | 101 04 428 | 9/2003 |
| DE | 202004006461 | 9/2004 |
| DE | 600 16 116 | 11/2005 |
| DE | 202006009088 | 9/2006 |
| DE | 202010008068 | 11/2010 |
| EP | 0630773 | 12/1994 |
| EP | 2439090 | 4/2012 |
| KR | 100474795 | 3/2005 |

\* cited by examiner

CONTROL ELEMENT AND ASSEMBLY FOR AN AIR VENT AS WELL AS METHOD FOR MOUNTING A CONTROL ELEMENT

BACKGROUND OF THE INVENTION

This invention relates to a control element and an assembly for an air vent in a vehicle as well as to a method for mounting such control element on a slat of an air vent.

Air vents for vehicles include at least one control element, in order to control the direction and/or the strength of the exiting air stream. With a receptacle, the control element for example is shiftably mounted on a pivotable slat which can deflect the air stream. To on the one hand provide for an easy shifting of the control element on the slat, but on the other hand also provide for a low-noise bearing of the control element on the slat, additional components, for example rubber elements or additional spring elements, are provided between control element and slat, by which a clearance-free bearing of the control element on the slat is accomplished.

During assembly of these known control elements it is, however, possible that these additional components are damaged or get lost. Additional spring elements for example can get lost during transport or during assembly due to their small size. In addition, the spring element can be shifted during assembly, so that the same is not positioned correctly and cannot fulfill the desired function. Beside a spring action, rubber elements also effect an increase of the friction between slat and control element, so that higher operating forces are required.

SUMMARY OF THE INVENTION

It is the object of the invention to create a control element and an assembly with such control element which have a simpler construction so that the manufacturing and mounting effort is reduced. At the same time, a reliable function must be ensured. The object of the invention furthermore is to provide a method for mounting such control element.

To this end, there is provided a control element for an air vent in a vehicle, comprising a bearing portion which serves for the air-vent-side bearing of the control element and includes a receptacle, in particular for a slat of an air vent, and comprising a spring element which protrudes into the receptacle of the holding portion, wherein the spring element is integrally molded to the control element or in the receptacle, i.e. is part of the receptacle so to speak. According to the invention, no separate spring element thus is used, but the same is integrally molded to the control element. Since the spring element is no separate component, but integrally connected with the control element, the control element includes much less components. Thus, a much faster and easier assembly of the control element is possible, since among other things the exact positioning of the spring element need not be taken care of. This is effected automatically in the case of a correct assembly of the control element. In addition, the spring element cannot get lost before or during assembly.

To simplify the manufacture and a future assembly of the control element, the control element preferably includes a bearing part on which the receptacle is provided, as well as a holding part to which the spring element is integrally molded. The receptacle for example is formed by a cutout extending through the control element. Integrally molding additional elements inside such receptacle, for example in the case of a one-part control element, would involve a very great manufacturing effort, in particular when such control element is made of plastics by an injection molding method. For this reason, the spring element is integrally molded to a holding part whereas the receptacle is provided on a second component, the bearing part. Since only the receptacle is provided at the bearing part, an easy manufacture is possible. The holding part can be formed such that the spring element is exposed during the manufacture so that the same likewise is easy to manufacture. Only during assembly of the holding part at the bearing part is the spring element introduced into the receptacle. This two-part design of the control element in addition offers the advantage that the bearing part also can be mounted on the air vent before assembly of the holding part. Since the spring element does not protrude into the receptacle, the same cannot apply a spring force to the bearing part or the control element and thus impede the assembly or make it more difficult. Only after the assembly and positioning of the bearing part the holding part is mounted, the spring element is guided into the receptacle and the spring force is applied to the control element.

For attachment of the holding part to the bearing part, any type of corresponding fastening elements can be provided at the bearing part and at the holding part. To ensure a quick and easy assembly, cooperating latching elements preferably are provided at the bearing part and at the holding part so that no tool is required for mounting the holding part on the bearing part.

The spring element can have any desired shape which is suitable to produce a bias between control element and slat. The spring element for example is a leaf spring which is integrally molded to the control element, with one or both ends.

It is, however, also conceivable that the spring element is formed substantially U-shaped, i.e. extends further into the receptacle, wherein the spring element is integrally connected with the control element with the legs of the U.

Alternatively, the spring element also can include two, in particular flexible, webs extending away from the control element as well as an in particular double-S-shaped, transverse web connecting the webs. Due to the shape and flexibility of the webs and of the transverse web an individual adaptation of the spring force is possible.

Independent of its shape, the spring element in addition can include a protrusion protruding into the receptacle. The same provides for example for a limitation of the shifting hub of the control element on the slat whereby an excessive loading of the bearing of the slat or of the adjusting mechanism for the slat by shifting the control element too far is prevented reliably. For this purpose, the spring element rests against the slat in a recess provided at the slat and extending in longitudinal direction of the slat. The control element can be shifted in longitudinal direction of the slat until the protrusion rests against an end of the recess. Further shifting is not possible or only possible against an increased resistance. Thus, the control element cannot be shifted beyond the regular range of adjustment of the air vent or only if excessive forces are being applied.

The control element for example is made of plastics. On the one hand, the control element therefore is of very light weight. On the other hand, an easy manufacture is possible, for example with an injection molding method. Preferably, metallic additives are provided in the spring element by which the surface hardness and/or the abrasion resistance of the spring element is increased, so that a premature wear of the spring element due to the friction between spring element and slat can be prevented.

Alternatively, the spring element and/or the control element also can have an abrasion-resistant coating, in particular a metallic coating. By the choice of the coating, the friction between the slat and the spring element and thus the control element also can be influenced. Depending on the coating, the control element thus can be shifted on the slat with a higher or lower resistance. In particular, in an embodiment with a bearing part and a holding part such coating can be applied easily in that the finished component is completely or partly immersed into the coating, or the coating, is applied galvanically or electrochemically. The coating can, however, also be applied already during the manufacture of the component.

It is also conceivable that the viewing region of the control element and the spring element are coated with a chrome plating. By such chrome plating, a high-quality appearance of the control element is produced beside an increased abrasion resistance. In addition, the handle region of the control element arranged in the viewing region also can be formed more resistant. The two chrome platings in particular can be applied at the same time.

The receptacle for example is a cutout extending through the control element, through which a slat of an air vent can be guided. With such receptacle a safe bearing of the control element on the slat is possible, wherein the same can be shifted on the slat in longitudinal direction. In this embodiment, the spring element protrudes into the receptacle such that the same is biased against the slat and the control element thus is mounted on the slat without clearance.

The invention, furthermore provides an assembly for an air vent in a vehicle, comprising at least one slat and a control element according to the invention, wherein the slat extends through the receptacle and the control element with the receptacle is mounted on the slat, in particular shiftable to a limited extent, and the spring element is biased against the slat.

Preferably, the slat includes a recess extending in longitudinal direction of the slat, and the spring element rests against the slat in this recess. The control element can be shifted until the spring element abuts against the end of the recess. Thus a simple and effective limitation of the shifting path of the control element is created. An excessive loading of the bearing of the slat or the adjusting mechanism for the slat by shifting the control element too far is thus reliably prevented.

Furthermore, there is provided a method for mounting a control element with a bearing part and a holding part on a slat of an air vent, which includes the following steps:

The bearing part with the receptacle is pushed onto the slat, in particular in longitudinal direction of the slat, The holding part is attached to the bearing part, in particular locked in place, wherein the spring element comes to rest against the slat and is biased against the same.

When the spring element protrudes into the receptacle already during assembly of the bearing part, for example because the control element is formed in one part or the spring element is provided at the bearing part, mounting the control element on the slat is made difficult by the spring element. The spring element would be biased already during assembly, whereby sliding the control element onto the slat is possible only with a major expenditure of force. The resistance to shifting the control element on the slat would be particularly high if a recess was provided at the slat, which would result in a great deformation of the spring. In addition, the spring element can be damaged during assembly. By pushing the bearing part onto the slat without the spring element, which is provided on the separate holding part, an easy assembly of the bearing part is possible with a small resistance. Only after the bearing part is pushed onto the slat and is positioned correctly, in particular in the region of the recess defining the shifting path, the holding part with the spring element is mounted on the bearing part and the spring is biased against the slat. By removing the holding part, an easy disassembly of the bearing part also is possible.

BRIEF DESCRIPTION OF THE DRAWINGS

Further advantages and features can be taken from the following description in conjunction with the attached drawings, in which.

DESCRIPTION OF EXEMPLARY EMBODIMENT

Figure 1:
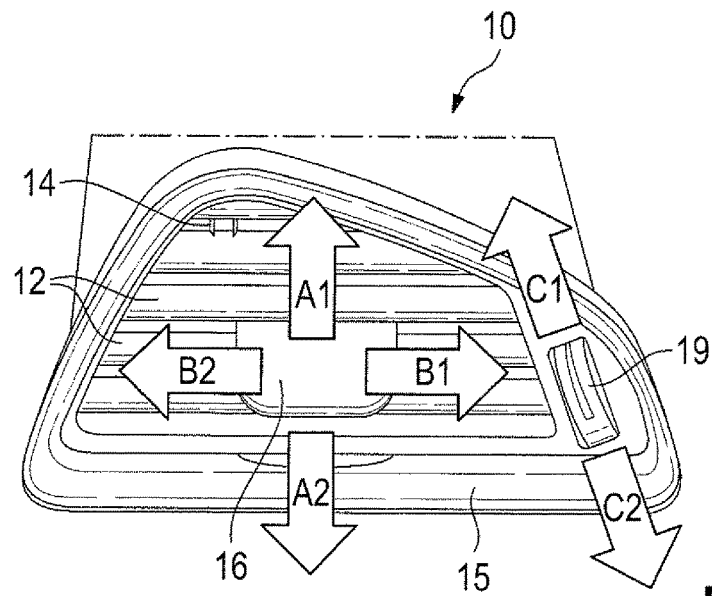
FIG. 1 shows an air vent with an assembly according to the invention.

FIG. 1 shows an air vent 10 for a vehicle. The air vent 10 has a plurality of first, slats 12 which here extend horizontally, and a plurality of second, slats 14 which here extend vertically and are arranged behind the first slats. The slats 12, 14 each are pivotally mounted about their longitudinal axis in the housing 15 of the air vent 10 and can be pivoted in order to deflect the air stream from the air vent 10. A control element 16 is provided on one of the slats 12, in order to pivot the slats 12, 14. Furthermore, an adjusting wheel 19 is provided in order to regulate the air quantity flowing through the air vent 10.

The control element 16 is shiftable on the slat 12 to a limited extent in two first actuating directions B1, B2 in longitudinal direction of the slat 12. The second slats 14 are coupled with the control element 16 via an actuating mechanism such that the second slats 14 are pivoted about their longitudinal axis by shifting the control element in the actuating directions B1, B2, so that the air stream is deflected to the left or right with respect to FIG. 1.

Furthermore, the control element 16 can be pivoted in two second actuating directions A1, A2 extending perpendicularly to the first actuating directions B1, B2, in order to pivot the slats 12 about their longitudinal axis and thus deflect the air stream upwards or downwards with respect to FIG. 1.

Figure 2:
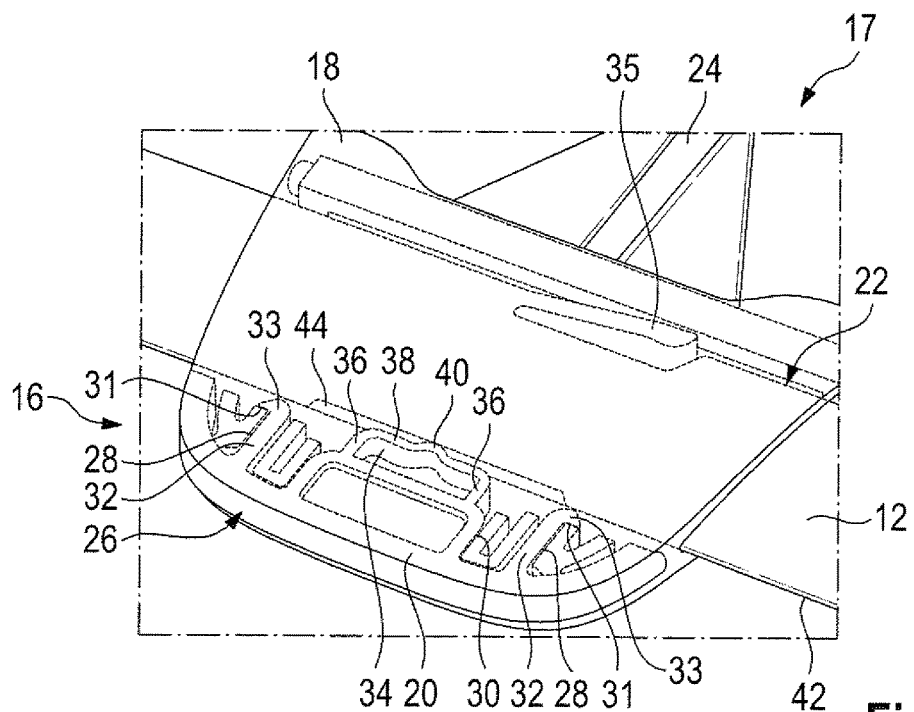
FIG. 2 shows a perspective detail view of the assembly of FIG. 1 with a control element according to the invention.
Figure 3:
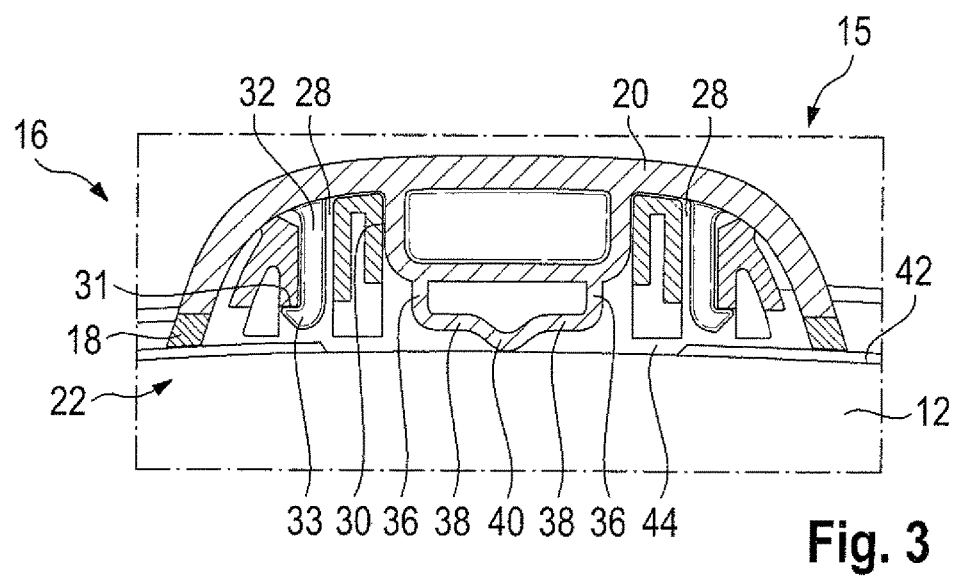
FIG. 3 shows a side view of the assembly of FIG. 2.

The assembly 17 of the control element 16 and the slat 12 on which the control element 16 is mounted, is shown in detail in FIGS. 2 and 3.

In this embodiment, the control element 16 has two components, namely a bearing part 18 and a holding part 20 attached to the bearing part 18. Alternatively, the control element 16 can also consist of one component which is formed in one part.

The bearing part 18 includes a receptacle 22 extending through the bearing part 18, which is formed by a cutout. The slat 12 extends through this receptacle 22 so that the bearing part 18 is mounted on the slat 12. The receptacle 22 has a uniform cross-section along the entire length, which substantially corresponds to the cross-section of the slat 12. Thus, the control element 16 can be shifted in longitudinal direction of the slat 12, i.e. in the actuating directions B1, B2.

On the back of the bearing part 18, there is furthermore provided a fork-like bearing 24 for an actuating mechanism of the second slat 14.

On the front side 26 of the bearing part 18 facing the vehicle interior, an opening 28 as well as two receiving channels 30 are provided. The opening 28 extends from the front side 26 to the receptacle 22.

The holding part 20 includes two protruding latching webs 32 corresponding to the receiving channels 30. Furthermore, a spring element 34 is provided which is integrally molded to the holding part and, as will be explained below, protrudes through the opening 28 into the receptacle 22 in the mounted condition of the holding part 20 at the bearing part 18.

At the receiving channels 30 and the latching webs 32, corresponding fastening elements 31, 33 are provided which here are latching elements. For mounting the holding part 20 on the bearing part 18, the holding part 20 is directed against the bearing part 18, in particular vertically to the slat 12, whereby the latching webs 32 are guided in the receiving channels 30 and the spring element 34 into the opening 28 until the fastening elements 31, 33 snap together and the spring element 34 protrudes into the receptacle 22.

As can be seen in FIGS. 2 and 3, the spring element 34 includes two webs 36 extending away from the holding part 20, which webs can be designed flexible. These webs 36 are connected with a double-S-shaped transverse web 38, which is formed flexible.

In the receptacle 22, the spring element 34 is urged against the slat 12 and biased against the same. As a result, the control element 16 is biased against the slat 12 without play so that the same can be shifted in longitudinal direction of the slat, i.e. in the actuating directions B1, B2, but a generation of noise, for example by rattling of the control element 16 against the slat 12, is reliably prevented.

Furthermore, a spring tab 35 is provided on the back of the slat 12, which is biased against the receptacle opposite to the spring element 34 so that the control element 16 is biased between spring element 34 and spring tab 35.

As shown in FIG. 2, a protrusion 40 is formed at the transverse web 38 due to the double-S shape, which protrusion rests against the slat 12 in a recess 44 arranged at the slat 12 in longitudinal direction of the front edge 42. Due to this recess 44, the shifting path of the control element 16 on the slat 12 is limited in the actuating directions B1, B2. The control element 16 can be shifted in the actuating directions B1, B2 until the protrusion 40 each rests against an end of the recess 44. Due to this limitation of the shifting path, an overload of the actuating mechanism for the second slats 14 by pivoting the control element 16 too far is reliably prevented.

For cost reasons, but also to ensure an easy manufacture, the control element 16 is made of plastics. The holding part 20 and the bearing part 18 for example each can then be manufactured by an injection molding method. Due to the two-part shape with a holding part 20 and a bearing part 18, an easier injection molding of the components is possible since the individual components, the bearing part 18 and the holding part 20, have a much simpler construction with less undercuts.

A one-part manufacture of the control element 16 is likewise possible, but distinctly more expensive due to the spring element 34 which in such embodiment protrudes into the receptacle 22 already during manufacture.

To increase the abrasion resistance of the spring element 34 which rubs against the slat 12 during adjustment of the air vent 10, metallic additives for example can be provided in the spring element 34, which increase the strength of the plastic material. Alternatively, the entire holding part 20 also can include such metallic additives.

Instead of such metallic additives it is also conceivable that the control element 16 is made of plastics and wholly or partly provided with an abrasion-resistant coating. To improve the abrasion resistance and also the slidability of the spring element 34 on the slat 12, a metallic coating, in particular a chrome plating, can also be used.

The control element 16 can be provided with such coating merely in the viewing region and at the spring element 34 in order to provide the control element with a high-quality appearance. In addition, the control element thus can be formed more resistant in the visible handle region. Preferably, the entire holding part can also be chrome-plated. The coating can be applied already during the manufacture of the bearing part 18 and the holding part 20 or also only after injection molding of the components, for example electrochemically.

In the embodiment shown here, the control element is formed in two parts, with the receptacle 22 for the slat 12 being provided on a first part, the bearing part 18, and the spring element 34 is provided on a second part, the holding part 20.

This provides for easier mounting of the control element 16 on the slat 12. In a first manufacturing step, the bearing part 18 can be pushed onto the slat 12 in longitudinal direction, this being effected with a small resistance since the spring element 34 does not yet bias the control element 16 against the slat 12. When the bearing part 18 is positioned at the slat 12, preferably in the region of the recess 44, the holding part 20 is put onto the bearing part 18 whereby the spring element 34 is being against the slat 12.

Thus, besides easier pushing of the bearing part 18, a damage of the spring element 34 due to the increased forces during pushing of the control element 16 onto the slat 12 is reliably prevented. For an easy disassembly of the control element, the holding part 20 can be removed, whereby an easy shifting of the bearing part 18 is possible.

Instead of the double-S shape, the spring element 34 can however also have any other shape. It is merely required that the spring element 34 can exert a spring force on the slat 12, which acts substantially vertically to the same, in order to accomplish a clearance-free bearing on the slat 12. The spring element 34 for example can be formed U-shaped, i.e. have a straight transverse web instead of a double-S-shaped transverse web 38. It is also possible that the spring element 34 is a leaf spring which with one or both ends is integrally molded to the control element 16.

Instead of the illustrated latching between bearing part 18 and holding part 20, other corresponding fastening elements 31, 33 can also be used. In particular, other cooperating latching elements can be used.

The invention claimed is:

1. A control element for an air vent in a vehicle, the control element comprising:
   a bearing part including a receptacle, wherein a slat is configured to extend through the receptacle to mount the bearing part to the slat;
   the receptacle having a recess that passes through to a front edge of the slat and extends along a longitudinal direction of the front edge of the slat;
   the bearing part forming a holding part wherein the holding part includes an integrally formed spring element, and
   wherein the spring element is a leaf spring which body ends thereof are integrally molded to the control element so as to bias against the slat within the receptacle by extending into the recess to rest against the slat in the recess.

2. The control element according to claim 1, wherein cooperating fastening elements, in particular latching elements, are provided at the bearing part and at the holding part.

3. The control element according to claim 1, wherein the spring element is formed substantially U-shaped, with the spring element with the legs of the U being integrally connected with the control element.

4. The control element according to claim 1, wherein the spring element includes two flexible webs extending away from the control element and a double-S-shaped transverse web connecting the webs.

5. The control element according to claim 1, wherein the control element is made of one or more plastics and metallic additives in the spring element.

6. The control element according to claim 1, wherein the spring element and/or the control element have an abrasion-resistant coating.

7. The control element according to claim 1, wherein the control element in a viewing region and the spring element are coated with a chrome plating.

8. The control element according to claim 1, wherein the receptacle is a cutout extending through the control element, through which a slat of an air vent can be guided.

9. An assembly for an air vent in a vehicle, comprising at least one slat and a control element according to claim 1, wherein the slat extends through the receptacle and the control element with the receptacle is mounted on the slat, in part icular shiftable to a limited extent, and the spring element is biased against the slat.

10. The control element of claim 1, wherein the control element is configured to be biased between the spring element of the holding part and a spring tab of the slat.

11. The control element of claim 1, wherein a rear end of the holding part couples to a front end of the bearing part.

12. An assembly for an air vent in a vehicle, the assembly comprising:
   a slat; and
   a control element including:
      a bearing part including a receptacle, wherein a slat is configured to extend through the receptacle to mount the bearing part to the slat;
      the receptacle having a recess through to a front edge of the slat and extends along a longitudinal direction of the front edge of the slat;
      the bearing part forming a holding part wherein the holding part includes an integrally formed spring element, and
      wherein the spring element is a leaf spring which body ends thereof are integrally molded to the control element so as to bias against the slat within the receptacle by extending into the recess to rest agianst the slat in the recess.

13. The assembly of claim 12, wherein the control element is biased between the spring element of the holding part and a spring tab of the slat.

* * * * *